(12) United States Patent
Schlunke

(10) Patent No.: US 12,509,219 B2
(45) Date of Patent: Dec. 30, 2025

(54) SYSTEM FOR LIFT, PROPULSION AND CONTROL OF AN AIRBORNE CRAFT

(71) Applicant: NORAERO AS, Vear (NO)

(72) Inventor: Kim Schlunke, City Beach (AU)

(73) Assignee: NORAERO AS, Vear (NO)

( * ) Notice: Subject to any disclaimer, the term of this patent is extended or adjusted under 35 U.S.C. 154(b) by 0 days.

(21) Appl. No.: 18/681,875

(22) PCT Filed: Aug. 17, 2022

(86) PCT No.: PCT/EP2022/072973
§ 371 (c)(1),
(2) Date: Feb. 7, 2024

(87) PCT Pub. No.: WO2023/021095
PCT Pub. Date: Feb. 23, 2023

(65) Prior Publication Data
US 2024/0336350 A1 Oct. 10, 2024

(30) Foreign Application Priority Data
Aug. 17, 2021 (AU) ................................ 2021902564

(51) Int. Cl.
*B64C 15/14* (2006.01)
*B64C 9/04* (2006.01)
*B64C 21/04* (2023.01)

(52) U.S. Cl.
CPC ................ *B64C 15/14* (2013.01); *B64C 9/04* (2013.01); *B64C 21/04* (2013.01)

(58) Field of Classification Search
CPC ........... B64C 15/14; B64C 9/04; B64C 21/04; B64C 23/02; B64C 39/005; B64C 21/01
See application file for complete search history.

(56) References Cited

U.S. PATENT DOCUMENTS

| | | |
|---|---|---|
| 3,178,131 A | 4/1965 | Laing |
| 7,641,144 B2 | 1/2010 | Kummer et al. |

(Continued)

FOREIGN PATENT DOCUMENTS

| | | |
|---|---|---|
| CN | 110834714 | 2/2020 |
| EP | 3281865 A | 2/2018 |

(Continued)

OTHER PUBLICATIONS

ISR WOISA dated Dec. 6, 2022, filed inter alia as a statement of relevance for any non-English references cited therein.

(Continued)

*Primary Examiner* — Joshua D Huson
*Assistant Examiner* — Anna L. Gordon
(74) *Attorney, Agent, or Firm* — Christian D. Abel

(57) ABSTRACT

A system for providing lift, propulsion and control for an aircraft vehicle that facilitates vertical take-off and landing/short take-off and landing operations is described. The system is configured to provide an airfoil that has a leading and a trailing edge, a cross flow fan partially embedded in the airfoil and mounted adjacent to the trailing edge of the airfoil and an exit duct for the cross flow fan to provide distributed flow along the trailing edge of the system to achieve high propulsive efficiency in forward flight and a substantially vertical jet for vertical take-off and landing.

11 Claims, 6 Drawing Sheets

(56) References Cited

U.S. PATENT DOCUMENTS

| | | | |
|---|---|---|---|
| 9,789,959 B2 | 10/2017 | Prisell | |
| 10,421,541 B2 * | 9/2019 | Groninga | ................ B64C 15/12 |
| 10,633,090 B2 * | 4/2020 | Lord | ..................... B64C 11/006 |
| 2009/0289150 A1 * | 11/2009 | Birkenstock | .......... B64C 1/0009 |
| | | | 244/207 |
| 2010/0006695 A1 | 1/2010 | Aguilar | |
| 2012/0111994 A1 | 5/2012 | Kummer et al. | |

FOREIGN PATENT DOCUMENTS

| | | | | |
|---|---|---|---|---|
| IT | RM20100476 | | 3/2012 | |
| RO | 134042 | | 4/2020 | |
| WO | WO-2021038911 A1 * | 3/2021 | ........... B64C 11/006 |
| WO | WO-2021099596 A1 * | 5/2021 | ............. B64C 37/00 |

OTHER PUBLICATIONS

IPRP date Aug. 8, 2023, iled inter alia as a statement of relevance for any non-English references cited therein.

* cited by examiner

SYSTEM FOR LIFT, PROPULSION AND CONTROL OF AN AIRBORNE CRAFT

FIELD OF THE INVENTION

The invention relations to system and method for lift, propulsion, and control of an airborne craft. More specifically, to control the elements of the system to achieve the required lift, propulsion and control of the aircraft during vertical, horizontal and transitional flight operations.

BACKGROUND

Current advances in aircraft technologies have facilitated propulsion systems with greater efficiency. Further, with the introduction of stronger and lighter materials, additive manufacturing process, computer controlled systems, the use of electric power sources and other alternative energy sources further advances have enabled the development of Vertical Take-Off and Landing (VTOL)/Short take-off and Landing (STOL) vehicles for usage not only for military purposes but also for commercial purposes.

Most of these VTOL and STOL systems today employ a vectored thrust mechanism to provide vertical flight capability. This is achieved by designing the propulsion system in multiple ways. However, these propulsion systems typically require rotating or tilting the entire vehicle and/or engines and/or propellors, thereby necessitating complex structures and mechanisms.

The cross-flow fan (CFF) or tangential fan, developed in 1893 by Mortier is used extensively in the heating, ventilating and air conditioning (HVAC) industry. The fan is usually long relative to the diameter, so the flow approximately remains 2-dimensional (2D) along the length of the fan. The CFF uses an impeller with forward curved blades, placed in a housing consisting of a rear wall and vortex wall. Unlike radial machines, the main flow travels transversely across the impeller, passing the blading twice.

FIG. 1 illustrates a prior art system that shows a section view of a typical HVAC configuration. For efficient forward flight of an airborne craft, the propulsor must ingest and expel the flow at a small angle to the forward flight direction. The conventional HVAC-type CFF housing, characterized by approximately a 90 degree turn from inlet to outlet, is not well suited for this application.

The popularity of the CFF comes from its ability to handle flow distortion and provide high pressure coefficient. Effectively a rectangular fan, the diameter readily scales to fit the available space, and the length is adjustable to meet flow rate requirements for the particular application. Since the flow both enters and exits the impeller radially, the cross-flow fan is well suited for aircraft applications particularly where a spanwise trailing edge air jet is desirable for distributed propulsion. Due to the 2D nature of the flow the fan readily integrates into an airfoil for use in both thrust production and vectoring and boundary layer control.

In addition to increased propulsive efficiency, embedded propulsion provides reduced noise and increased safety, since the propulsor is now buried within the structure of the aircraft (e.g. no exposed propellers). Also, by eliminating the engine pylon/nacelle support structure, the aircraft parasitic drag can be reduced by up to 18 to 20%, thus improving cruise efficiency and range.

Attempts to provide a cross-flow fan in aircraft wings have been largely unsuccessful. For example, some system designs use cross-flow fans embedded within the middle of a conventional airplane wing. Other system designs distribute fully embedded cross-flow fans near the trailing edge of a conventional transport aircraft, with shafts and couplings connecting them to wing-tip and root-mounted gas turbines. Air is ducted into the fan from both wing surfaces and expelled out at the trailing edge. These system designs, however, limit the fan size and ducting. Also, the CFF may not be a viable option for high-speed applications due to compressibility effects (i.e. choking). These configurations fall short of expectations due to poor fan placement and poor housing design. These deficiencies result in low fan performance, reduced circulation control and low thrust production.

Some attempts have also been made to vary the geometry of the CFF exit region to vector the exit flow through relatively small angles for flight at high angles of attack and/or pitch control in forward flight during STOL flight for example. However, efficient VTOL flight using the same fan and exit ducting has not been contemplated due to the difficulty of achieving an aerodynamically efficient geometry for both applications.

In particular in the prior art, Kummer and Dang et al disclose changes to the various surfaces of a flap that is mounted aft of a crossflow fan to assist in Short Take Off and Landing (STOL) and stall characteristics at high angles of attack. In particular, U.S. Patent Publication Nos. 2012/0111994 (Kummer) published May 10, 2012 discloses an inlet face that rotates about its leading edge and also discloses a lower flap face that is distorted about its leading edge and a fan rear face that will vary the clearance from the rotor.

It is noted that this may be applicable to VTOL operation. However, this form of VTOL, where the craft occupants must take-off and land while facing skyward, with the ground semi-visible behind them is generally judged as unacceptable. U.S. Pat. No. 9,783,291 B2 (Kummer) issued Oct. 10, 2017 later discloses adding axial fans to a craft with a crossflow fan to avoid this issue and to provide further thrust directed downward to achieve effective VTOL operation albeit with the added complexity and weight.

Many VTOL craft which transport personnel are therefore arranged so that the fuselage remains roughly horizontal and the thrust for propulsion and VTOL is vectored by rotating the propulsive elements on a wing or a rotor and motor pod for example. Another popular alternative is to provide separate rotors for vertical flight and horizontal flight (Aurora etc.). This design has the further advantage that the thrust required for VTOL is many times greater than that required for horizontal flight and this can provide significant improvements in both forward flight propulsive efficiency and lifting efficiency. However, this adds to the cost and complexity of the system.

Therefore, there is a need for an improved and advanced propulsion system with a vector thrust mechanism. Moreover, there is a need for a propulsion system of modular design provided with vector thrust mechanisms for imparting VTOL/STOL capabilities to a vehicle with better efficiency and reduced complexity.

SUMMARY

In an embodiment, of the present invention provides a system for lift, propulsion and control for an aircraft vehicle to facilitate Vertical take-off and landing (VTOL)/Short takeoff and landing (STOL) operations, the system comprising:
  a. at least one airfoil extending from a leading edge to a trailing edge.

b. a rotor being a cross-flow fan rotor at least partially embedded in the airfoil and substantially the same length as the airfoil and mounted adjacent to the trailing edge of the airfoil; and c. an exit duct for the cross-flow fan configured to provide distributed flow along the trailing edge of the system to achieve high propulsive efficiency in forward flight and a substantially vertical jet for vertical take-off and landing.

The system is further provided with a flap rotatable about a rotor axis, where the flap has an upper face and a lower face, and where the airfoil includes a flexlip with an upper face (16) that forms the exit duct In an embodiment, the system may be provided with a flap connected to the airfoil and rotatable about a rotor axis and the airfoil includes a flexlip.

The system further comprising the exit duct that further comprises a. the lower face of the flap on one side; and an upper face of the flexlip on the other side.

The exit duct is further configured to eject a longitudinal jet of air required for producing the vertical lift in combination with a predefined fan speed of the cross flow fan and position of the flexlip and the flap. In an example, the predefined speed may be a suitable speed of the fan to produce the longitudinal jet of air required for the vertical lift of the aircraft.

In an embodiment, the system may further comprise several elements that are configured in the crafts airframe at multiple locations, and which include a thick airfoil, an embedded cross-flow fan and an exit duct. Further, the exit duct produces distributed flow along the trailing edge of the system for high propulsive efficiency in forward flight and the exit duct can be reconfigured to produce a substantially vertical jet for vertical take-off and landing (VTOL).

In an embodiment, the present invention provides a lift, propulsion and control element for an airborne craft that can be configured in the crafts airframe in multiple locations. The system is further configured with an airfoil extending from a leading edge to a trailing edge and a cross-flow fan rotor at least partially embedded in and substantially the same length as the airfoil and mounted adjacent to the trailing edge of the airfoil and an exit duct for the fan with two faces comprising i. The lower face of a flap connected to the airfoil and rotatable about the rotor axis, the flap also having an upper face whose inner edge controls the inlet flow area to the rotor.

ii. The upper face of a flexlip that moves in concert with the flap lower face and substantially parallel with it to direct the airflow from the fan so that substantially uniform distributed thrust is developed along the length of the element.

In an embodiment, the system provides the exit duct as described wherein the flap and flexlip are mechanically connected and moved to produce thrust that can be vectored from a substantially horizontal direction to a substantially vertical direction.

In an embodiment, the flap and the flexlip are connected and moved through an angle so that the thrust can be vectored through an angle of more than 70 degrees.

In an embodiment, the present invention provides the exit duct as described wherein the flap and flexlip are connected so that each moves simultaneously but at a different angular rate to deliver a desired change in both the angle and mass flow of the vectored thrust.

In an embodiment, the present invention provides the exit duct as described wherein the flap and flexlip are connected and actuated or moved through an angle so that the thrust can be vectored through an angle of more than 70 degrees.

In an embodiment, the present invention provides the exit duct as described wherein a change in the actuated angles of the flap and lip produce a change in the magnitude and/or direction of said thrust the change being used to control the attitude of the aircraft.

In an embodiment, the present invention provides the exit duct as described wherein the inner edge of the upper face of the flap consequentially rotates to increase the inlet flow area to the rotor such that, when combined with increased rotor speed, increased mass flow is available from the fan when the flap is rotated to the position to produce vertical thrust for VTOL operation.

In an embodiment, the present invention provides an airfoil, embedded cross-flow fan and exit duct element with distributed flow that has low parasitic drag in forward flight.

In an embodiment, the present invention provides an airfoil, embedded cross-flow fan and exit duct element with distributed flow wherein the airfoil has a thickness to chord ratio greater than 30% and any flow separation is limited by boundary layer ingestion into the crossflow fan.

In an embodiment, the present invention provides an airfoil, embedded cross-flow fan and exit duct element wherein the rotor speed of the cross-flow fan is independent of any other fans on the craft and the speed is varied relative to the other fans to assist in controlling the attitude and flight direction of the aircraft.

In an embodiment, the present invention provides an airfoil, embedded cross-flow fan and exit duct element wherein the crossflow fan has a rotor diameter between 10% to 30% and more specifically in the ranges of 15% to 25% of the chord of the airfoil.

In an embodiment, the present invention provides an airfoil, embedded cross-flow fan and exit duct element wherein the airfoil has an upper surface radius that is between the ranges of 50% to 60%. In an example, the range may be configured to be 55 and 58% of chord and extending over more than one third of the upper surface, a lower surface that is substantially flat and extends over more than one third of the lower surface and a rear surface that forms the rear wall of the embedded crossflow fan.

In an embodiment, the present invention provides an airfoil, embedded cross-flow fan and exit duct element that facilitates parasitic drag in forward flight that decreases with increasing angle of attack up to a maximum of between 5 and 15 degrees. In another embodiment, the angle of attack may be varied outside the ranges of 5 to 15 degrees.

In an embodiment, the present invention provides an airfoil, embedded cross-flow fan and exit duct element wherein the cross-flow fan ingests the boundary layer the airfoil and thereby facilitates stall free operation at angles of attack between 5 and 20 degrees. In another embodiment, the angle of attack may be varied outside the ranges of 5 to 20 degrees.

In an embodiment, the present invention provides an airfoil, embedded cross-flow fan and exit duct element wherein the exit duct can be configured to deflect the jet from the trailing edge of the element through an angle of between 50 and 90 degrees from the jet direction for optimal forward flight.

In the forgoing embodiments, the ranges for angle of attack, surface radius of the airfoil, exit duct element etc. can also be configured to be varied outside the ranges defined herein. The above embodiments discuss example implementations and are not limited to the same.

BRIEF DESCRIPTION OF THE DRAWINGS

The drawings herein are appended to facilitate the understanding of the invention. The drawings show embodiments of the invention and do not intend to limit the invention. The drawings will now be described by way of example only, where.

DETAILED DESCRIPTION

Figure 1:
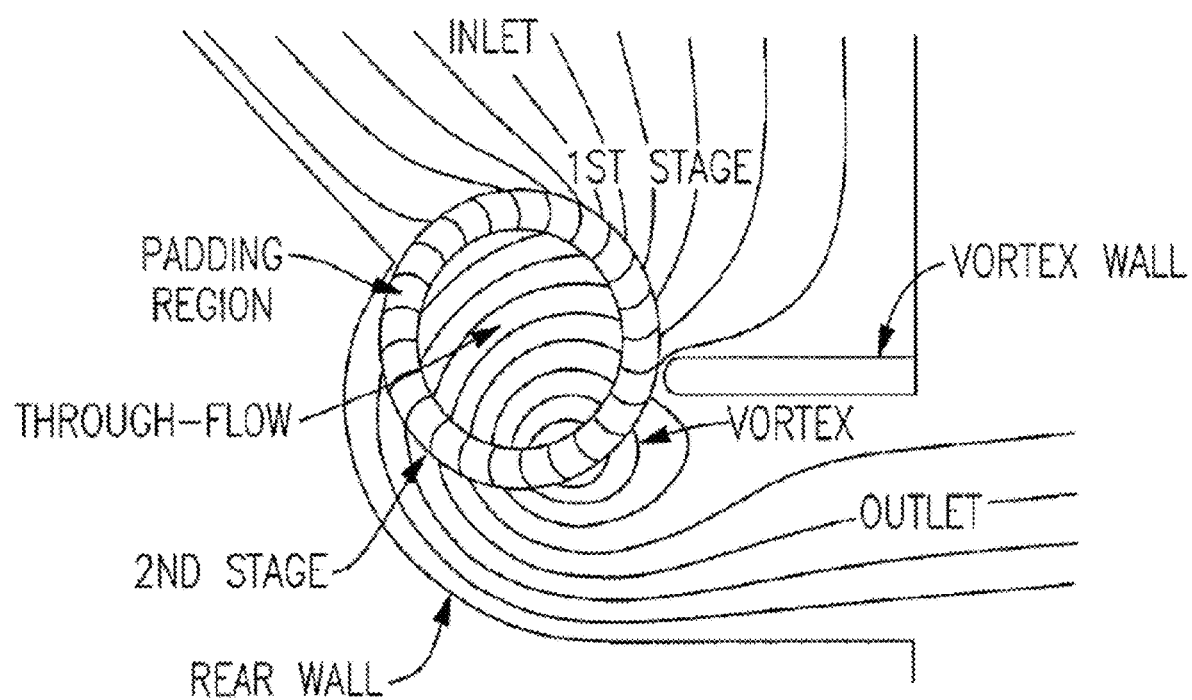
FIG. 1 is illustrating a prior art cross-flow fan.

In the detailed description, different alternatives will be discussed in more detail with reference to the appended drawings. It should be understood, however, that the drawings are not intended to limit the scope of the invention to the subject-matter depicted in the drawings. The scope of the invention is defined in the appended claims.

In the exemplary embodiments, various features and details are shown in combination. The fact that several features are described with reference to a particular example should not be construed as implying that those features as a necessity have to be included together in all the embodiments of the invention. Conversely, features that are described with reference to different embodiments should not be construed as mutually exclusive. As those skilled in the art will readily understand, embodiments that incorporate any subset of features described herein and that are not expressly interdependent have been contemplated by the inventor and are part of the intended disclosure. However, explicit descriptions of all such embodiments would not contribute to the understanding of the principles of the invention, and consequently some permutations have been omitted for the sake of simplicity.

In an embodiment, some terminologies such as 'airborne craft and aircraft' are used alternatingly throughout the description and do not intent to limit the scope of the invention.

FIG. 1 is illustrating a prior art cross-flow fan. The CFF is provided with an inlet and an outlet, padding region, a rear wall and vortex wall. A first stage and a second stage to manage the through flow through the CFF. As indicated earlier, FIG. 1 shows a sectional view of a Heating, Ventilating and Air Conditioning (HVAC) configuration of the cross-flow fan. For efficient forward flight of an airborne craft, the propulsor must ingest and expel the flow at a small angle to the forward flight direction. The conventional HVAC-type CFF housing, characterized by approximately a 90 degree turn from inlet to outlet, is not well suited for this application.

Figure 2:
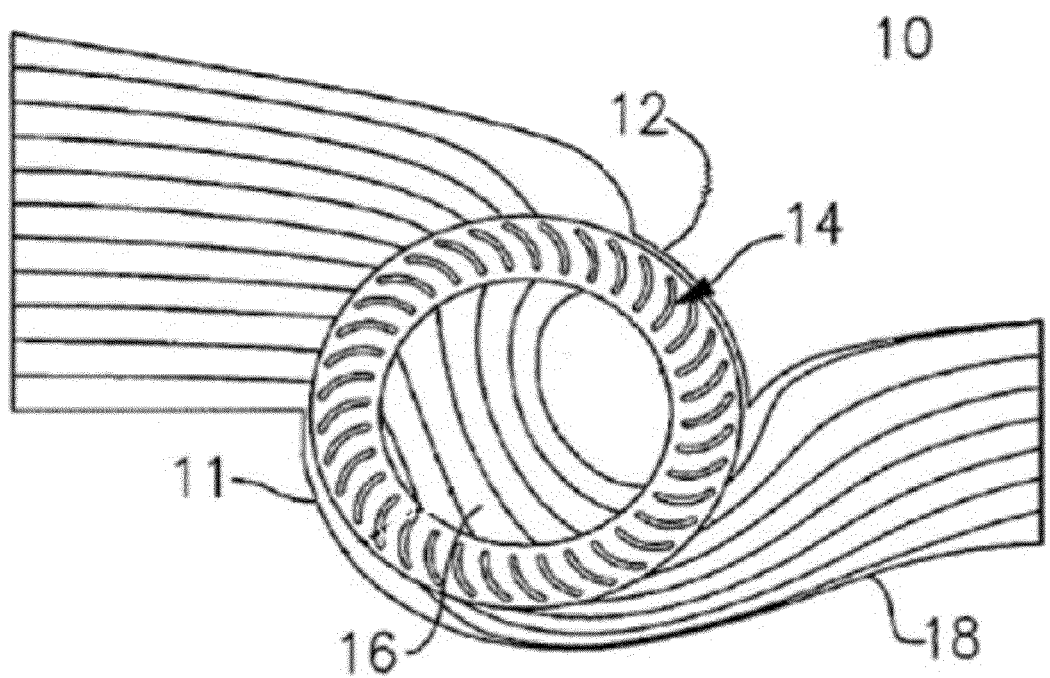
FIG. 2 is an illustration of a baseline inline housing according to an embodiment of the present invention.

FIG. 2 is an illustration of a baseline inline housing according to an embodiment of the present invention. The crossflow fan (CFF) assembly 10 consisting of a rotor 14, a rear wall 11 and a vortex wall 12. The through flow achieved is illustrated by 16.

Figure 3:
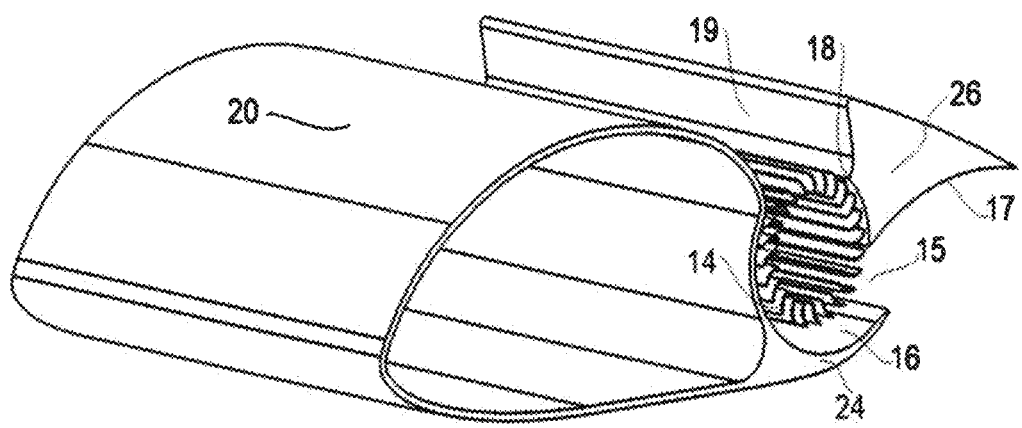
FIG. 3 illustrates a diagram of a lift, propulsion and control system showing the exit duct geometry of the flap and flexlip when configured for forward flight.

FIG. 3 illustrates a diagram of a lift, propulsion and control system showing the exit duct geometry of the flap and flexlip when configured for forward flight. As shown in FIG. 3 there is seen an airfoil 20, a flexlip 24 attached to and forming part of airfoil 20, a crossflow fan rotor 14, a flap 26 rotatable and mounted about the axis of the rotor 14 and an exit duct 15 from the crossflow fan rotor 14 and formed by the lower face 17 of flap 26 and the upper face 16 of flexlip 24. The position of the flexlip 24 and flap 26 are as shown in FIG. 3. With the flexlip 24 and flap 26 configured in this position and with a suitable fan speed, a longitudinal jet of air from duct 15 is ejected from the length of the lift, propulsion and control system to achieve distributed propulsion, and desirably the forward flight propulsive efficiency benefits. Synergistically, the edge 18 of face 19 of the flap 26 restricts the inlet area to the crossflow fan to provide an optimal flow rate through the fan for best propulsive efficiency.

Figure 4:
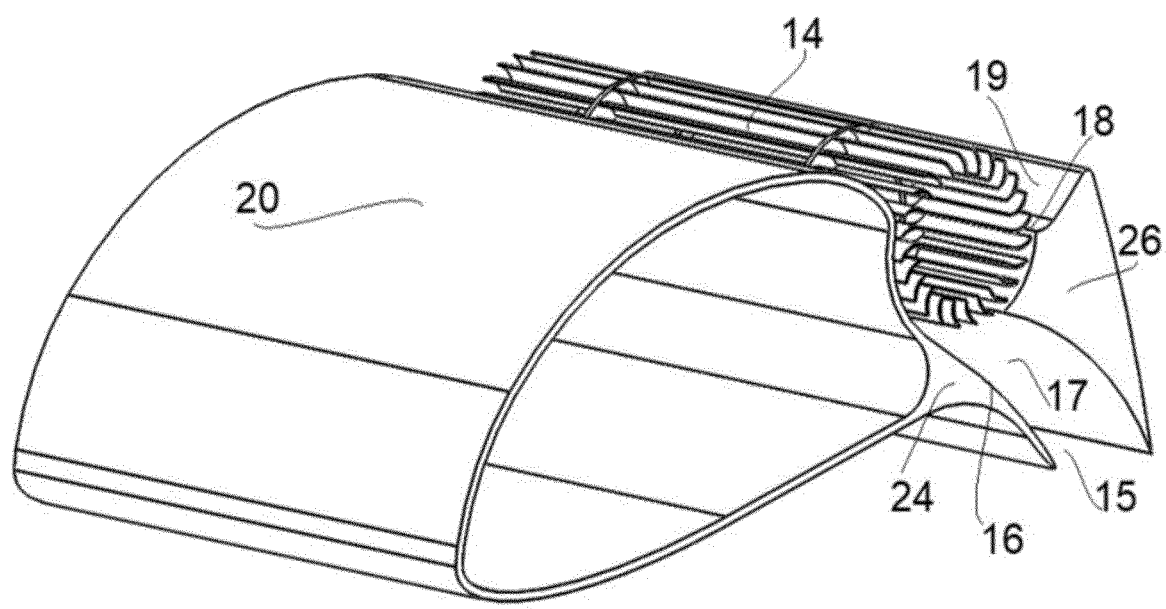
FIG. 4 is an illustration of a lift, propulsion and control system showing the exit duct geometry of the flap and flexlip when configured for VTOL operation.

FIG. 4 is an illustration of a lift, propulsion and control system showing the exit duct geometry of the flap and flexlip when configured for VTOL operation. In the VTOL configuration as shown in FIG. 4 the flexlip 24 and the flap 26 are moved to different position as compared to FIG. 3. Shown is an airfoil 20, a flexlip 24 attached to and forming part of airfoil 20, a crossflow fan rotor 14, a flap 26 rotatable and mounted about the axis of rotor 14 and an exit duct 15 from the crossflow fan rotor 14 and formed by the lower face 17 of flap 26 and the upper face 16 of flexlip 24. With the flexlip 24 and flap 26 configured in this position, ie. with the flexlip and flap rotated with respect to FIG. 3, and with a suitable fan speed, a longitudinal jet of air from duct 15 is ejected from the length of the lift, propulsion and control system to achieve a substantially vertical jet thereby producing upward thrust or vertical lift for VTOL operation. Synergistically, the edge 18 of face 19 moves to create a much larger inlet area to the crossflow fan thereby providing an optimal flow rate through the fan for vertical thrust.

Figure 5:
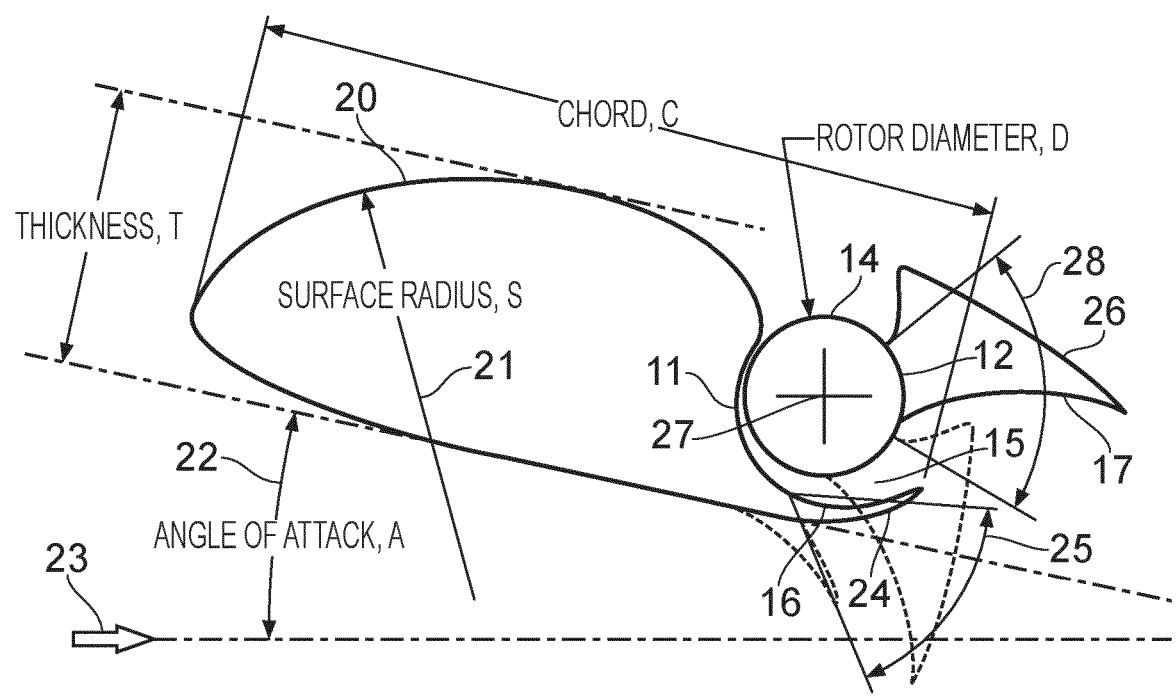
FIG. 5 illustrates a cross section of an airfoil, embedded crossflow fan and exit duct geometry according to the present invention showing the range of movement of the flap and flexlip.

FIG. 5 illustrates a cross section of an airfoil, embedded crossflow fan and exit duct geometry according to the present invention showing the range of movement of the flap and flexlip. Referring now to FIG. 5, there is seen an airfoil 20 with an upper surface radius 21 and an angle of attack 22 to the airstream direction 23 and a crossflow fan assembly consisting of a rotor 14, a rear wall 11 and a vortex wall 12, a rear flexlip 24 which flexes through an angle 25 and has an upper face 16, a flap 26 that rotates about the rotor axis 27, can rotate through an angle 28 and has a lower face 17, an exit duct 15 formed by upper face 16 of the flexlip and lower face 17 of the flap. In an embodiment, the angle 28 can be configured to be different from the angle 25. In an embodiment, according to the invention, the angle of attack 22 is set achieve a maximum lift to drag ratio in conjunction with the exit angle of the duct jet. Further, the area ratio of the fan inlet area to fan exit area may be configured to be optimized by the movement of flap 26 for both high propulsive efficiency in the upper position and high vertical thrust in the lower position.

Furthermore, despite relatively low fan efficiency, the present invention is competitive with conventional propulsion technologies. The raised inlet formed by flap 26 eliminates the fan size restriction created if the fan is fully embedded within the airfoil 20. Also, cross-flow fan performance is quite insensitive to even large amounts of wake ingestion, making it ideal for this type of configuration. The fan of the present invention is capable of drawing in the boundary layer, regardless of its thickness.

Referring to the thick airfoil 20 seen in FIGS. 3, 4 and 5, even for a low angle of attack 22, the wake can be quite large, producing large pressure drag. This renders very thick wing sections impractical for most aircraft applications as the drag penalty outweighs any benefits gained in lift or interior volume. With-out the suction effect of a rear-mounted crossflow fan rotor 14, the flow separates even at only a small angle of attack. The embedded cross-flow fan near the trailing edge eliminate flow separation by drawing the flow back toward the surface and into the fan ducting, yielding very high lift coefficients. This is turn results in low in-flight aircraft stall speed without the use of additional high lift devices, such as slotted flaps and leading edge slats but more importantly, facilitates small short high lift wings that can be readily configured into lifting elements described herein for compact airborne craft.

In forward flight, the distributed propulsion generated by the long spanwise jet of air from duct 15 gives rise to the phenomenon known as distributed propulsion which can be used to generate a very high propulsive efficiency in forward flight. This, together with the lower drag resulting from the absence of engine nacelle, pylon, and interference drag offsets any low fan efficiency.

By vectoring the thrust using co-ordinated control of the flap 26 and flexlip 24, consequentially opening the inlet to the crossflow fan and increasing fan speed, additional lifting force sufficient to achieve VTOL is possible. This configuration is illustrated in FIG. 4. and FIG. 5 and in FIG. 7. where the wide range of authority of the flexlip and flap are shown.

In an embodiment, it is determined that a more ideal Lift, Propulsion and Control Element for a VTOL aircraft with a crossflow fan would desirably vector the flow from a substantially horizontal direction to a substantially vertical direction but would also provide for efficient increased thrust during VTOL because the thrust required for VTOL operation is significantly more than that required for forward propulsion. This additional thrust can be achieved by increasing rotor speed, but this decrease lifting efficiency or power loading. To offset this loss of efficiency fan area is increased.

The embodiments described in FIGS. 3 and 4 achieve a system wherein the flap is rotated about the rotor axis in such a way that the ratio of inlet to exit area of the fan is varied synergistically with the redirecting of the exit duct air jet. In a first position, a flexing or morphing lip coordinates with a flap to provide both a desirable exit flow vector for forward flight propulsive efficiency and a desirable area ratio across the fan, the flap and lip then moved to a second position provide sufficient change in the area ratio across the fan and redirection of the exit flow vector to provide effective VTOL operation. The effective VTOL operation allows the wing element and attached fuselage and passengers to remain substantially horizontal during take-off, landing and transition to cruise flight.

Figure 6:
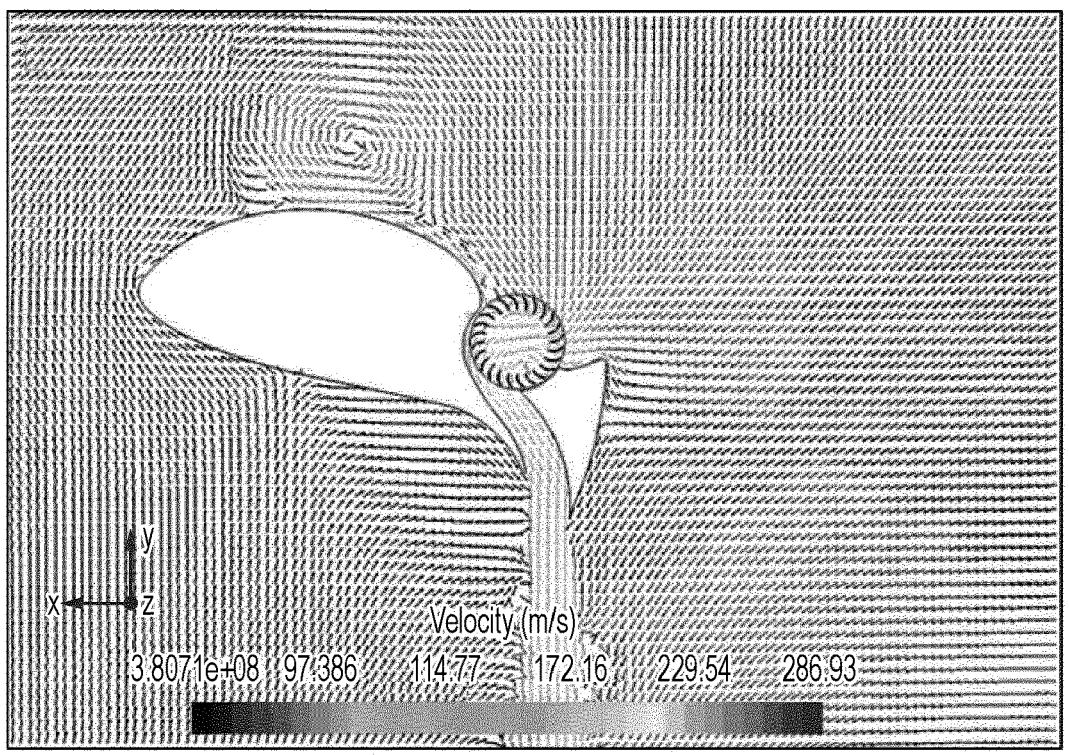
FIG. 6 is a diagram illustrating the flow around and through the wing and crossflow fan element when configured for VTOL, according to the present invention.

FIG. 6 is a diagram illustrating the flow around and through the wing and crossflow fan element when configured for VTOL, according to the present invention. The variation in the position of the flap and the flexlip can be observed to achieve the required VTOL.

Figure 7:
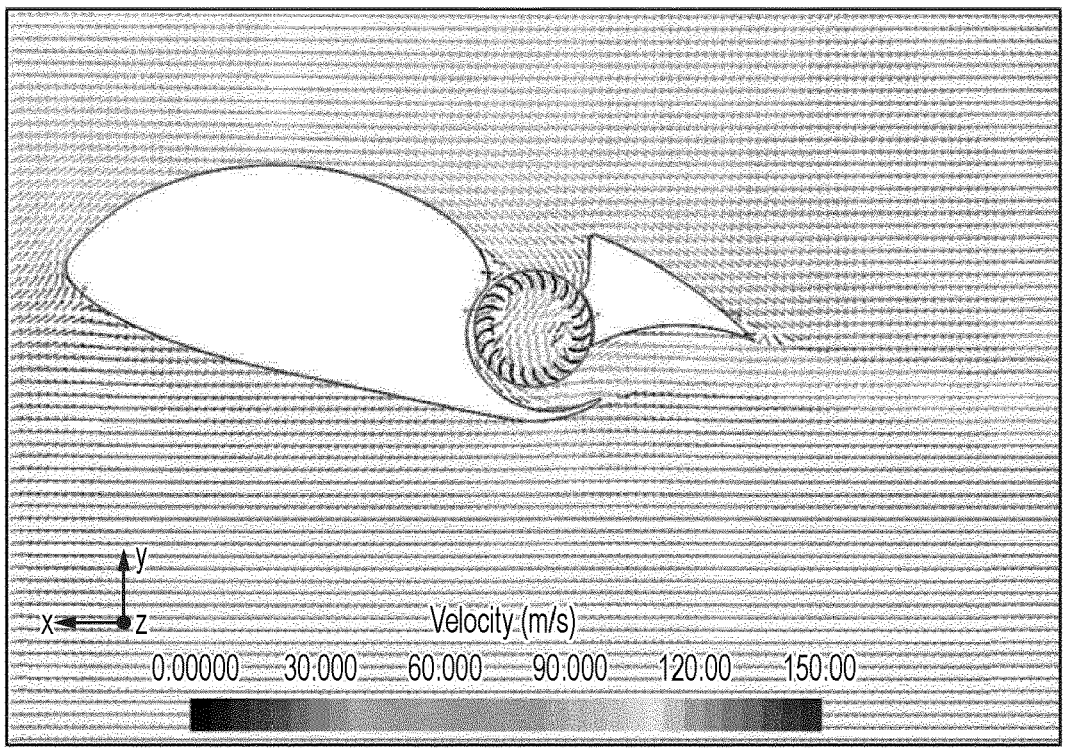
FIG. 7 is a diagram illustrating the flow around and through the wing and crossflow fan element when configured for horizontal forward flight, according to the present invention.

FIG. 7 is a diagram illustrating the flow around and through the wing and crossflow fan element when configured for horizontal forward flight, according to the present invention. The variation in the position of the flap and flexlip for horizontal forward flight to achieve the required thrust is observed in FIG. 7 are different from the previous FIG. 6.

The system of the present invention achieves two configurations with the variations in the positions of the flap and the flexlip and thus varies the air duct and helps to achieve the required thrust for both forward flight motions and vertical take-off and landing of the aircraft.

The invention claimed is:

1. A system for providing lift, propulsion, and control for Vertical take-off and landing (VTOL)/Short take-off and landing (STOL) operations of an aircraft vehicle, the system comprising:
   a. at least one airfoil extending from a leading edge to a trailing edge;
   b. a cross-flow fan, having a rotation axis and substantially the same length as the airfoil and mounted adjacent to the trailing edge of the airfoil; and
   c. an exit duct for the cross-flow fan configured to provide distributed flow along the trailing edge of the system; the airfoil configured to provide vectored thrust; and the system further comprises:
   d. a flap arranged rotatable about the cross-flow fan rotation axis, where the flap has an upper face and a lower face, and where the airfoil includes a flexing or morphing lip, with an upper face, wherein the lower face of the flap and the upper face of the flexing or morphing lip forms the exit duct; wherein the flap and the flexing or morphing lip forming the exit duct are further configured to move simultaneously but at different angular rate to deliver a desired change in angle and mass flow of the vectored thrust.

2. The system in accordance with claim 1, wherein the exit duct is further configured to eject a longitudinal jet of air required for producing the vertical lift by a combination of a predefined fan speed of the cross flow fan and position of the flexing or morphing lip and the flap.

3. The system in accordance with claim 1, where the lower face of the flap is configured to move in concert with and in parallel with the upper face of the flexing or morphing lip.

4. The system in accordance with claim 1, wherein the flap and the flexing or morphing lip of the exit duct are mechanically connected and configured to produce thrust that can be vectored from a substantially horizontal direction to a substantially vertical direction.

5. The system in accordance with claim 1, wherein the flap and the flexing or morphing lip are configured to be moved through an angle to obtain thrust that can be vectored through an angle to produce change in both magnitude and direction of the thrust.

6. The system in accordance with claim 1, wherein the flap and flexing or morphing lip are connected and moved through an angle so that the thrust can be vectored through an angle of more than 70 degrees.

7. The system in accordance with claim 1, wherein the airfoil has a thickness to a chord ratio that is greater than 30% and flow separation is limited by boundary layer ingestion into the cross-flow fan.

8. The system in accordance with claim 1, wherein the airfoil comprises a curved upper surface that is curved with an upper surface radius between 50% to 60% of the airfoil chord and where the curve extends over at least one third of the upper surface, a lower surface that is substantially flat and extends over at least one third of the lower surface and a rear surface.

9. The system in accordance with claim 1, wherein the cross-flow fan is configured with a rotor diameter between 10% to 30% of the chord of the airfoil.

10. The system in accordance with claim 1, wherein the system is configured to further provide a distributed flow along the cross-flow fan that has low parasitic drag in the forward flight and the drag decreases with increase in an angle of attack of the airfoil up to a maximum between 5 and 15 degrees.

11. The system in accordance with claim 1, wherein the cross-flow fan is configured to ingest the boundary layer of the airfoil to facilitate stall free operation at angles of attack between 5 and 20 degrees.

\* \* \* \* \*